US006768732B1

(12) United States Patent
Neuhaus

(10) Patent No.: US 6,768,732 B1
(45) Date of Patent: Jul. 27, 2004

(54) CONFIGURATION FOR DATA TRANSMISSION VIA A COMMUNICATION NETWORK

(75) Inventor: Ralf Neuhaus, Lünen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/527,123

(22) Filed: Mar. 16, 2000

(30) Foreign Application Priority Data

Mar. 16, 1999 (DE) .......................................... 199 11 714

(51) Int. Cl.[7] .......................... H04L 12/66; H04L 12/56; H04M 7/00
(52) U.S. Cl. ...................... 370/352; 370/230; 370/401; 370/410; 379/219
(58) Field of Search ................................ 370/230, 265, 370/352, 353, 354, 355, 235, 356, 357, 398, 401, 420, 463, 495, 543; 379/93.24, 219, 220, 224

(56) References Cited

U.S. PATENT DOCUMENTS

| | | | |
|---|---|---|---|
| 5,790,548 A | | 8/1998 | Sistanizadeh |
| 6,351,524 B1 | * | 2/2002 | Schuster et al. |
| 6,359,881 B1 | * | 3/2002 | Gerszberg et al. |
| 6,480,494 B1 | * | 11/2002 | Hawley |
| 6,567,398 B1 | * | 5/2003 | Aravamudan et al. |
| 6,587,433 B1 | * | 7/2003 | Borella et al. |

FOREIGN PATENT DOCUMENTS

| | | |
|---|---|---|
| DE | 198 08 368 A1 | 9/1999 |
| WO | 97/46073 | 12/1997 |
| WO | 98/57485 | 12/1998 |
| WO | 99/04596 | 1/1999 |

OTHER PUBLICATIONS

"ADSL—unsymmetrical transferral techniques in local terminal lines" (Komp et al.), Telecommunications and Information Techniques, vol. 4, 1995, pp. 28–35.
"The virtual office" (Wild), Telcomreport, vol. 4, 1997, Siemens.

* cited by examiner

Primary Examiner—Afsar Qureshi
(74) Attorney, Agent, or Firm—Laurence A. Greenberg; Werner H. Stemer; Gregory L. Mayback

(57) ABSTRACT

A communication system (PBX) is connected via a local computer network (LAN) and an ADSL-oriented communication network (DSL-KN) to a communication terminal (DV-E). The communication system (PBX) has a teleworking module (HLB) which is in the form of a subscriber line module and is connected to the local computer network (LAN). After a communication terminal (DV-E) has logged on to the communication system (PBX), the teleworking module (HLB) controls data transmission between the communication system (PBX) and the communication terminal (DV-E) via the local computer network (LAN) and the ADSL-oriented communication network (DSL-KN).

9 Claims, 1 Drawing Sheet

CONFIGURATION FOR DATA TRANSMISSION VIA A COMMUNICATION NETWORK

BACKGROUND OF THE INVENTION

Field of the Invention

Because working conditions are increasingly becoming flexible in terms of time and location, the number of employees who do not perform their professional duties at their company workplace is constantly rising. "Das virtuelle Büro [The Virtual Office]", telcom report, issue 4, 1997, Siemens AG Berlin and Munich discloses that, in order to perform duties effectively outside the company, it is necessary, within the context of so-called 'Teleworking', to have access to the inhouse data and facilities offered on a company local area network, irrespective of the whereabouts of the employee.

German patent application 198 083 68.8 has proposed a configuration with which a communication terminal, subsequently called an external communication terminal, connected to a communication system via a communication network can, within the context of so-called 'teleworking logon', access inhouse data. Additionally, facilities implemented by the communication system are provided on the external communication terminal in the same way as on an internal communication terminal. In this case, the external communication terminal is connected to the communication system via an ISDN-oriented communication network, and useful data to be transmitted, as well as voice-oriented data, is transmitted via useful-data channels (B channels) of an ISDN connection between the communication system and the external communication terminal. This ISDN connection is either a dial-up connection set up for the duration of teleworking logon, or is alternatively a permanent connection set up administratively via the ISDN-oriented communication network.

In this configuration, generally, the voice-oriented data is transmitted via a first useful-data channel (B channel) and the useful data is transmitted via a second useful-data channel (B channel) of the ISDN connection. Transmission of the useful data via a useful-data channel of the ISDN connection restricts the maximum data transfer rate to 64 kbit/s, which is frequently no longer adequate for modern applications.

Since, within the context of teleworking logon, the ISDN connection existing between the external communication terminal and the communication system must generally be maintained over a relatively long period of time, high charges accrue for a company as a result of using the two useful-data channels of the ISDN connection.

SUMMARY OF THE INVENTION

It is accordingly an object of the invention to provide a configuration, within the context of teleworking logon, that allows data transmission between a communication system and a communication terminal that is logged on to the communication system via a communication network that overcomes the hereinafore-mentioned disadvantages of the heretofore-known configurations of this general type.

With the foregoing and other objects in view there is provided, in accordance with the invention, a configuration using a packet-oriented communication network for transmitting data between a communication system and a communication terminal. The configuration includes a packet-oriented communication network for providing data transmission to and from a communication terminal, and a network line unit providing access to the packet-oriented communication network. A local computer network is connected to the network line unit. A communication system is provided that includes a control module providing access to the local computer network. The control module is configured to enable the communication terminal to log on to the communication system and to control data transmission between the communication system and the communication terminal after the communication terminal has logged on to the communication system.

To provide a better understanding of the method steps being carried out during teleworking, it would appear necessary first of all to explain known principles in more detail once again.

If so-called teleworking logon is initiated by a subscriber on an external communication terminal, a data connection is set up between the communication system and the external communication terminal via a communication network connecting the communication system to the external communication terminal. In this case, the subscriber logs on to the communication system, for example, by entering a particular telephone number that is internal to the communication system on the external communication terminal.

To identify the external communication terminal to the telecommunication system, the telephone number of the external communication terminal is transmitted in the communication network to the communication system via the data connection. To authenticate the subscriber, an associated subscriber-specific identification number PIN (Private Identification Number) and, alternatively, or in addition, a subscriber-specific password is transmitted to the communication system via the data connection. Using a list that is stored in the communication system and that contains the telephone numbers authorized for teleworking, the external communication terminal's logon to the communication system is checked. If the check has confirmed the logon, a telephone number internal to the communication system is assigned to the external communication terminal by the communication system. At the same time, all calls directed to the communication-system-internal telephone number are forwarded to the external communication terminal.

In addition to the useful data that is transmitted, terminal-oriented signaling information which is to be transmitted from the communication system to the communication-system-internal telephone number is transmitted to the external communication terminal via a useful data channel of the data connection. The terminal-oriented signaling information is based, by way of example, on a signaling protocol internal to the communication system, such as is usually available for signaling interchange between internal communication terminals and the communication system. As a result of terminal-oriented signaling information based on the internal signaling protocol being transmitted to the external communication terminal, a subscriber on the external communication terminal is provided with all the facilities implemented by the communication system in the same way as on an internal communication terminal. Terminal-oriented signaling information is transmitted from the external communication terminal to the communication system in the same way in the opposite direction, provided that it is logged on to the communication system.

Thus, a significant advantage of the invention is that a high transmission bandwidth can easily be provided for the transmission of data between an external communication terminal and a communication system, as a result of logging the external communication terminal on to the communication system, via an available local computer network connected to the communication system and a broadband data transmission network connecting the local computer network to the external communication terminal.

In accordance with an added feature of the invention, unauthorized access to inhouse data is prevented by checking whether a user of an external terminal is authorized to log on to the communication system. The checking operation is performed by using subscriber-related data including a subscriber-specific identification number and, alternatively, or in addition, a subscriber-specific password.

In accordance with a concomitant feature of the invention, the external communication terminal is linked to the local computer network using ADSL connection technology (Asymmetric Digital Subscriber Line). This provides for the accrual of low charges, even if the external communication terminal is logged on for relatively long periods of time because a subscriber generally has to pay a basic monthly charge, but no additional connection charges, for his line.

Other features which are considered as characteristic for the invention are set forth in the appended claims.

Although the invention is illustrated and described herein as embodied in a configuration for data transmission via a communication network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The sole drawing FIGURE shows a schematic illustration of a configuration for data transmission between a communication system with a teleworking module and a communication terminal.

DESCRIPTION OF THE PREFERRED EMBODIMENTS

Figure 1:
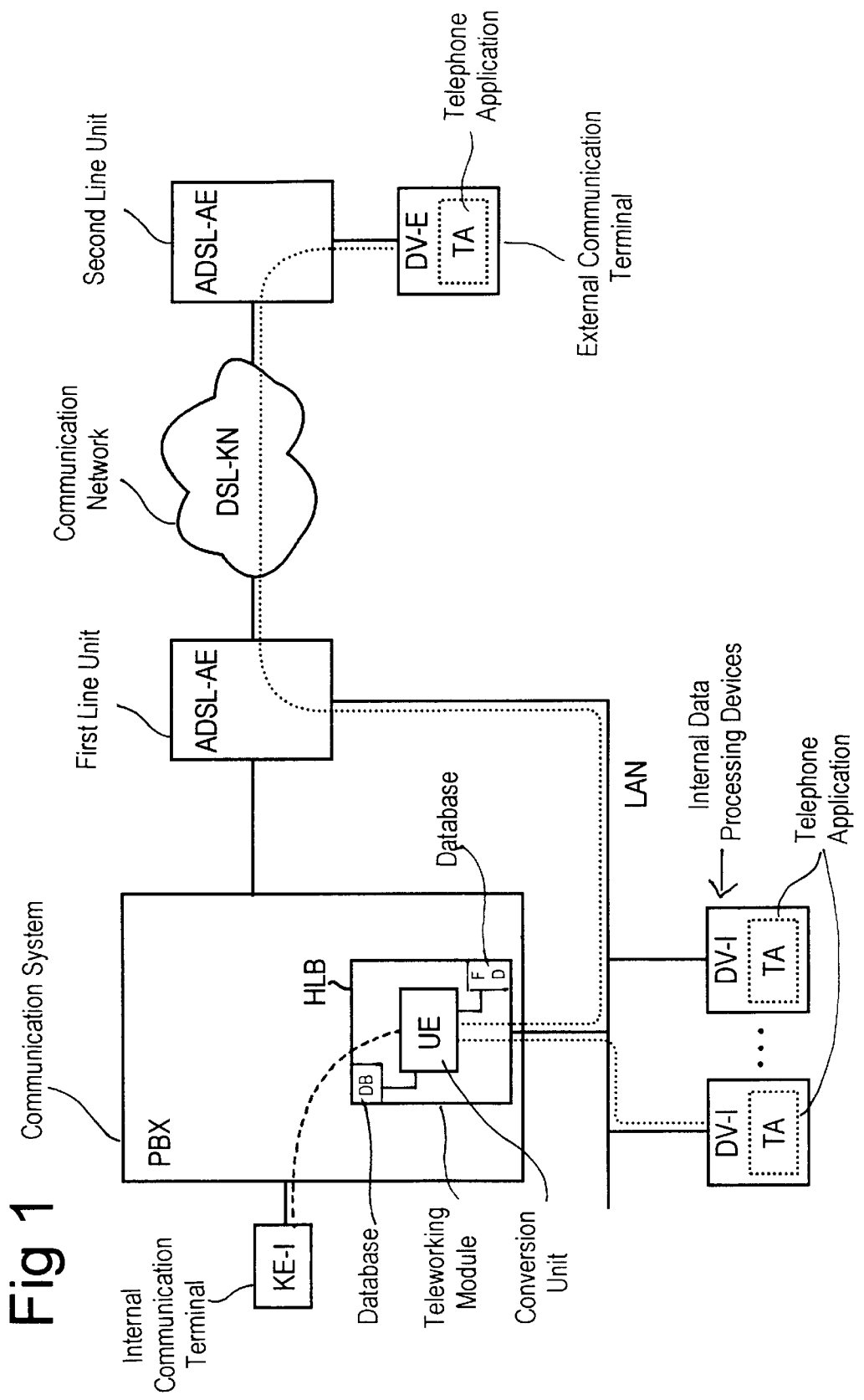

Referring now to the sole drawing FIGURE, a schematic illustration of a communication system PBX with a teleworking module HLB in the form of a subscriber line unit can be seen. The communication system PBX has further subscriber and network line units (not shown) for connecting communication terminals to the communication system PBX and for connecting the communication system PBX to a communication network, respectively.

The communication system PBX is connected via a first line unit ADSL-AE to a communication network DSL-KN based on so-called ADSL transmission technology. Data transmission on the basis of ADSL transmission technology is disclosed, for example, in the article: "ADSL-unsymmetrische Übertragungstechnik auf Ortsanschlußleitungen [ADSL-asymmetrical transmission technology on subscriber lines]", ntz Telekommunikation und Informationstechnik, volume 48, Nov. 4, 1995, particularly on pages 28–35. ADSL access technology enables the option of providing a broadband data channel, in addition to the conventional voice channel, on a subscriber network line using a copper line. This broadband data channel can be used to produce a data transfer rate of 6–8 Mbits/s in the direction from an ADSL-oriented communication network to the subscriber, frequently called the downstream direction in the literature. In the direction from the subscriber to the ADSL-oriented communication network, frequently called the upstream direction in the literature, it is only possible to achieve a data transfer rate of up to 600 kbit/s. Alternatively, transmission via the communication network DSL-KN can also take place on the basis of other DSL transmission technologies, for example, SDSL, HDSL, VDSL.

The communication network DSL-KN has an external communication terminal or an external data processing device DV-E (e.g. a so-called personal computer or a so-called workstation) connected to it via a second line unit ADSL-AE. The external data processing device DV-E has a software-implemented (indicated by the dotted line) telephone application TA. Such a telephone application TA provides a user of the external data processing device DV-E with all of the functional aspects or features of a conventional telephone. Such an application is therefore frequently also called a virtual telephone in the literature. However, a prerequisite of such a telephone application TA is that the data processing device DV-E be designed with a sound card for connecting suitable voice input means, e.g. a microphone, and voice output means, e.g. a loudspeaker, to the data processing device DV-E. In the present illustrative embodiment, an internal communication terminal KE-I is also connected to the communication system PBX.

A Local Area Network interface for the teleworking module HLB additionally connects the communication system PBX to a local computer network LAN. The local computer network LAN includes, by way of example, a plurality of internal data processing devices DV-I, with a telephone application TA being implemented on each of the internal data processing devices DV-I in a similar manner to the external data processing device DV-E. The local computer network LAN is also connected to the communication network DSL-KN via the first line unit ADSL-AE.

Data is transmitted between the internal communication terminal KE-I and the communication system PBX based on a time-slot-oriented data format (indicated by the dashed line), for example based on the known PCM data format (Pulse Code Modulation). Voice-oriented data is transmitted via the local computer network LAN, for example, based on the H.323 protocol (indicated by the dotted line), which is based on the known TCP/IP protocol (Transmission Control Protocol/Internet Protocol). For data transmission between the internal communication terminal KE-I and an internal data processing device DV-I or between the internal communication terminal KE-I and the external data processing device DV-E, the teleworking module HLB has a conversion unit UE which carries out bi-directional data conversion between the time-slot-oriented-PCM data format and the H.323 transmission protocol.

If a subscriber starts the telephone application TA on the external data processing device DV-E, a connection is set up, in a subsequent step, between the external data processing device DV-E and the teleworking module HLB via the communication network DSL-KN. In this case, it is a simple matter to log on to the teleworking module HLB of the communication system PBX, e.g. by dialing a particular internal subscriber line port in the communication system PBX.

As part of the logon procedure for the external data processing device DV-E, the teleworking module HLB carries out, for security reasons, both an identification check on the external data processing device DV-E and, in addition, an authentication check on the subscriber associated with the external data processing device DV-E. To this end, the telephone number assigned to the external data processing device DV-E in the communication network DSL-KN, and additionally if there is one an IP address (Internet Protocol) assigned to the external data processing device DV-E are transmitted via the connection for identification purposes. To authenticate the subscriber associated with the external data processing device DV-E, a subscriber-specific identification number PIN (Private Identification Number) and/or a subscriber-specific password are transmitted to the teleworking module HLB of the communication system PBX.

A database DB which is stored on the teleworking module HLB and that contains telephone numbers and/or IP addresses and subscriber-specific identification numbers PIN that are authorized for teleworking is used to carry out a logon check or verification with respect to the external data processing device DV-E. If the subscriber-specific identification number PIN that is stored in the database DB and that is associated with the transmitted telephone number and/or the IP address of the external data processing device DV-E does not match the transmitted subscriber-specific identification number PIN, the logon is not confirmed. The connection between the external data processing device DV-E and the teleworking module HLB is then terminated. In addition, the database DB stores a so-called call-back address for each external data processing device DV-E that is authorized to log on to the teleworking module HLB. This call-back address allows a connection to be set up from the communication system PBX to the respective external data processing device DV-E.

If, on the other hand, the subscriber-specific identification number PIN that is stored in the database DB and that is associated with the transmitted telephone number and/or the IP address of the external data processing device DV-E does match the transmitted subscriber-specific identification number PIN, the logon is confirmed. The external data processing device DV-E is also recorded as being logged on in the database DB. Alternatively, the external data processing device DV-E can be recorded as being logged on in a different database DF that is stored in the teleworking module HLB. At the same time, the external data processing device DV-E is assigned a telephone number internal to the communication system by the teleworking module HLB. In this context, each external data processing device DV-E is assigned an inherent communication-system-internal telephone number which is assigned to an external data processing device DV-E by the teleworking module HLB as a result of logging on. This ensures that an external subscriber can always be reached under the same subscriber telephone number. If the external data processing device DV-E has no inherent IP address assigned, then the external data processing device DV-E is assigned a temporary IP address in addition to the communication-system-internal telephone number. The inherent or temporary IP address can be used to transmit data from an internal data processing device DV-I to the external data processing device DV-E.

If a connection to the external data processing device DV-E is to be subsequently set up, for example, if the internal communication terminal KE-I dials the communication-system-internal telephone number that is assigned to the external data processing device DV-E or if data is to be transmitted from an internal data processing device DV-I to the external data processing device DV-E with the inherent or temporary IP address assigned as the destination address, then the data which is to be transmitted over the connection is transmitted from the teleworking module HLB to the external data processing device DV-E via the local computer network LAN and the communication network DSL-KN. In addition, terminal-oriented signaling information that is to be transmitted from the control unit in the communication system PBX to the communication-system-internal telephone number is transmitted to the external data processing device DV-E via the local computer network LAN and the communication network DSL-KN on the basis of a proprietary protocol.

The terminal-oriented signaling information is based, by way of example, on a communication-system-internal signaling protocol such as is usually available during signaling interchange between internal communication terminals KE-I and the control unit in the communication system PBX. As a result of terminal-oriented signaling information based on the internal signaling protocol being transmitted to the external data processing device DV-E, all of the facilities implemented by the communication system PBX are made available to the telephone application TA running on the external data processing device DV-E in the same way as they are made available to an internal communication terminal KE-I. Terminal-oriented signaling information is transmitted from the external data processing device DV-E to the control unit in the communication system PBX in the same way in the opposite direction, provided that it is logged on to the teleworking module HLB of the communication system PBX.

As a result of the data, both the voice-oriented data and the useful data which is to be transmitted between the external data processing device DV-E and the communication system PBX, being transmitted via an ADSL-oriented communication network connecting the local computer network LAN and the external data processing device DV-E, it is a simple matter to achieve a transmission bit rate of up to 600 kbit/s between the communication system PBX and the external data processing device DV-E.

In addition, by linking the external data processing device DV-E to the ADSL-oriented communication network, only low charges are incurred, even when the external data processing device DV-E is logged on to the communication system PBX for relatively long periods of time. This is because the external subscriber generally has to pay a basic monthly charge, and no additional connection charges for his line. This means that the external subscriber can permanently, frequently called always-on in the literature, access the internal data stored on the local computer network LAN and the facilities of the communication system PBX inexpensively.

What is claimed is:

1. A configuration using a packet-oriented communication network for transmitting data between a communication system and a communication terminal, the configuration comprising:

a packet-oriented communication network for providing data transmission to and from a communication terminal;

a network line unit providing access to said packet-oriented communication network;

a local computer network connected to said network line unit; and a communication system including a control module providing access to said local computer network, said control module configured to enable the communication terminal to log on to said communication system and to control data transmission between said communication system and the communication terminal over the local computer network, the network line unit, and the packet-oriented communication network after the communication terminal has logged on to said communication system.

2. The configuration according to claim 1, wherein said control module includes a conversion unit for converting a first data format, provided for transmitting voice-oriented data internal to said communication system to a second data format, provided for transmitting voice-oriented data via said local area network.

3. The configuration according to claim 1, wherein said control module includes a database storing subscriber-related data for checking whether a user of the communication terminal is authorized to log on to said communication system.

4. The configuration according to claim 3, wherein said subscriber-related data includes data selected from the group consisting of a subscriber-specific identification number and a subscriber-specific password.

5. The configuration according to claim 1, wherein said control module includes a database for storing terminal addresses that are assigned to the communication terminal while the communication terminal is logged on to said communication system.

6. The configuration according to claim 1, wherein said local computer network is configured to facilitate transmission of voice-oriented data using TCP/IP protocol.

7. The configuration according to claim 1, wherein said local computer network is configured to facilitate transmission of voice-oriented data using H.323 protocol based on TCP/IP protocol.

8. The configuration according to claim 1, wherein said packet-oriented communication network is configured to facilitate data transmission using the ADSL data transmission method.

9. The configuration according to claim 1, further comprising the communication terminal, the communication terminal being a data processing device with a software implemented telephone application.

* * * * *